United States Patent
Taruno (10) Patent No.: US 10,118,738 B2
(45) Date of Patent: Nov. 6, 2018

(54) LAYER SEPARATING CONTAINER

(71) Applicant: KYORAKU CO., LTD., Kyoto (JP)

(72) Inventor: Shinsuke Taruno, Kanagawa (JP)

(73) Assignee: KYORAKU CO., LTD., Kyoto (JP)

( * ) Notice: Subject to any disclaimer, the term of this patent is extended or adjusted under 35 U.S.C. 154(b) by 0 days.

(21) Appl. No.: 14/917,996

(22) PCT Filed: Sep. 18, 2014

(86) PCT No.: PCT/JP2014/074744
§ 371 (c)(1),
(2) Date: Mar. 10, 2016

(87) PCT Pub. No.: WO2015/046024
PCT Pub. Date: Apr. 2, 2015

(65) Prior Publication Data
US 2016/0221728 A1 Aug. 4, 2016

(30) Foreign Application Priority Data

Sep. 27, 2013 (JP) .................. 2013-201553
Sep. 27, 2013 (JP) .................. 2013-201558

(51) Int. Cl.
*B65D 23/00* (2006.01)
*B65D 35/14* (2006.01)
(Continued)

(52) U.S. Cl.
CPC .......... *B65D 35/14* (2013.01); *B05B 11/0043* (2013.01); *B05B 11/048* (2013.01);
(Continued)

(58) Field of Classification Search
CPC .............................. B65D 83/0055; B65D 1/32
(Continued)

(56) References Cited

U.S. PATENT DOCUMENTS 4,842,951 A 6/1989 Yamada et al.
5,407,629 A 4/1995 Schmidt et al.
(Continued)

FOREIGN PATENT DOCUMENTS

EP 0204324 A2 12/1986
EP 1078861 A2 2/2001
(Continued)

OTHER PUBLICATIONS

International Search Report dated Dec. 22, 2014 from corresponding International Patent Application No. PCT/JP2014/074744; 2 pgs.
(Continued)

*Primary Examiner* — Shawn M Braden
(74) *Attorney, Agent, or Firm* — Maier & Maier, PLLC (57) ABSTRACT

Provided is a delamination container that smoothly peels an inner layer from an outer layer in a body and can prevent the peel of an inner layer from an outer layer at an opening. A delamination container includes a body configured to contain contents and an opening through which the contents from the body are discharged. The body and the opening each include an outer layer and an inner layer. The inner layer peels from the outer layer and shrinks with a reduction in the contents. The inner layer includes, as an outermost layer, a layer having a standard peel strength of about 7 to 12 g/15 mm.

4 Claims, 5 Drawing Sheets (51) Int. Cl.
  *B05B 11/00* (2006.01)
  *B05B 11/04* (2006.01)
  *B32B 1/02* (2006.01)
  *B32B 27/30* (2006.01)

(52) U.S. Cl.
  CPC .............. *B32B 1/02* (2013.01); *B32B 27/306* (2013.01); *B32B 2323/10* (2013.01); *B32B 2439/02* (2013.01)

(58) Field of Classification Search
  USPC ........................................................ 215/12.2
  See application file for complete search history.

(56) References Cited

U.S. PATENT DOCUMENTS

| | | | |
|---|---|---|---|
| 6,419,393 | B1 | 7/2002 | Shibata |
| 6,669,387 | B2 * | 12/2003 | Gruenbacher ......... A01N 25/34 15/104.94 |
| 6,670,007 | B1 | 12/2003 | Safian et al. |
| 7,867,434 | B2 * | 1/2011 | Iwahashi ............... A61F 9/0008 264/40.1 |
| 8,844,774 | B2 * | 9/2014 | Leys .................. B65D 83/0055 222/105 |
| 9,211,993 | B2 * | 12/2015 | Tom ........................ B67D 7/025 |
| 2001/0040173 | A1 * | 11/2001 | Yamamoto ............. A45D 19/02 222/106 |
| 2013/0161341 | A1 | 6/2013 | Kneer |
| 2014/0190992 | A1 * | 7/2014 | Kuwagaki ............. B65D 77/06 222/95 |

FOREIGN PATENT DOCUMENTS

| | | |
|---|---|---|
| FR | 2866010 A1 | 8/2005 |
| JP | 06-505463 A | 6/1994 |
| JP | H06-239332 A | 8/1994 |
| JP | H06-345069 A | 12/1994 |
| JP | H08-175568 A | 7/1996 |
| JP | 3650175 B2 | 3/1997 |
| JP | 2000016459 A | 1/2000 |
| JP | 2000-225662 A | 8/2000 |
| JP | 2000335635 A | 12/2000 |
| JP | 2001-72131 A | 3/2001 |
| JP | 2003-267337 A | 9/2003 |
| JP | 2006096368 A | 4/2006 |
| JP | 2013529580 A | 7/2013 |
| WO | 2012000491 A2 | 1/2012 |

OTHER PUBLICATIONS

Extended European Search Report dated Sep. 19, 2016, including the Supplementary European Search Report and the European Search Opinion, in connection with counterpart EP Application No. 14848642.6 (8 pgs.).

Japanese Office Action dated Jul. 18, 2017, in connection with corresponding JP Application No. 2013-201553 (14 pgs., including English translation).

Japanese Preissuance Submission dated Sep. 19, 2017, in connection with counterpart JP Application No. 2013-201553 (6 pgs., including English translation).

Japanese Office Action dated Oct. 24, 2017, in connection with coounterpart JP Application No. 2013-201553 (11 pgs., including English translation).

Japanese Third-Party Preissuance Submission dated Jul. 10, 2018, in connection with corresponding JP Application No. 2013-201553 (4 pgs., including English translation).

* cited by examiner

LAYER SEPARATING CONTAINER

TECHNICAL FIELD

The present invention relates to a delamination container that peels an inner layer from an outer layer and shrinks it with a reduction in contents.

BACKGROUND ART

There have been known delamination containers that each peel an inner layer from an outer layer and shrink it with a reduction in contents and thus suppress the entry of air into the container (e.g., Patent Literature 1).

CITATION LIST

Patent Literature
[Patent Literature 1] Japanese Patent No. 3650175

SUMMARY OF INVENTION

Technical Problem

Such delamination containers include those that each include a polypropylene layer as the innermost layer of the outer layer and an EVOH layer as the outermost layer of the inner layer. The EVOH layer has excellent oxygen barrier properties, as well as is excellent in the peelability from the polypropylene layer. Accordingly, by employing such a layer configuration, a delamination container can be obtained that has excellent oxygen barrier properties and easily peels and shrinks an inner layer.

First Aspect

Typically, a delamination container includes a body for containing contents and an opening for discharging the contents. Such a delamination container is required to smoothly peel an inner layer from an outer layer in a body and to prevent the peel of an inner layer from an outer layer at the opening.

In view of the foregoing, a first aspect of the present invention provides a delamination container that can smoothly peel an inner layer from an outer layer in a body and can prevent the peel of an inner layer from an outer layer at an opening.

Second Aspect

However, through an investigation, the present inventors found that depending on the use environment of a delamination container, the oxygen barrier properties thereof might decrease and thus the contents might degrade.

In view of the foregoing, a second aspect of the present invention provides a delamination container that can control a reduction in oxygen barrier properties.

Solution to Problem

First Aspect

A first aspect of the present invention provides a delamination container including a body configured to contain contents and an opening through which the contents from the body are discharged. The body and the opening each include an outer layer and an inner layer. The inner layer peels from the outer layer and shrinks with a reduction in the contents. The inner layer includes, as an outermost layer, a layer having a standard peel strength of 7 to 12 g/15 mm.

Through an intensive investigation, the present inventors found that by setting, in a delamination container that peels an inner layer from an outer layer, the standard peel strength of the outermost layer of the inner layer to 7 to 12 g/15 mm, an ideal delamination container could be obtained that easily peeled an inner layer from an outer layer in a body and was less likely to peel an inner layer from an outer layer at an opening, and then completed the present invention.

Various embodiments of the first aspect of the present invention are described below. The embodiments below can be combined with each other.

Preferably, the outermost layer is an EVOH layer.
Preferably, the EVOH layer contains an oxygen absorbent. Preferably, the EVOH layer has an ethylene content of 30 mol % or less.
Preferably, the outer layer includes a polypropylene layer, as an innermost layer.

Second Aspect

A second aspect of the present invention provides a delamination container including an outer layer and an inner layer. The inner layer peels from the outer layer and shrinks with a reduction in contents. The inner layer includes an EVOH layer, an outer barrier layer disposed on a side adjacent to an outer surface of the container, of the EVOH layer, and an inner barrier layer disposed on a side adjacent to an inner surface of the container, of the EVOH layer.

Through an intensive investigation, the present inventors found the following: when an EVOH layer was exposed to water vapor, the oxygen barrier properties thereof might decrease; when an inner layer peeled from an outer layer in a delamination container, an EVOH layer was exposed to air entering between the inner layer and outer layer; and thus when the delamination container was used in a high-humidity environment, the oxygen barrier properties of the EVOH layer decreased and thus the contents degraded.

The present inventors then found that by disposing barrier layers on both sides of the EVOH layer, a reduction in the oxygen barrier properties of the EVOH layer was controlled and thus the degradation of the contents was suppressed, and then completed the present invention.

Various embodiments of the second aspect of the present invention are described below. The embodiments below can be combined with each other.

Preferably, the EVOH layer contains an oxygen absorbent.
Preferably, the inner layer further includes an outer EVOH layer disposed on a side adjacent to the outer surface of the container, of the outer barrier layer.

BRIEF DESCRIPTION OF THE DRAWINGS

FIGS. 1A and 1B are sectional views showing the configuration of a delamination container 1 of a first embodiment of the present invention, in which FIG. 1A shows the state in which an outer layer 3 and an inner layer 5 are in contact with each other and FIG. 1B shows the state in which the inner layer 5 is peeled from the outer layer 3.

DESCRIPTION OF EMBODIMENTS

Now, embodiments of the present invention will be described. Various features described in the embodiments below can be combined with each other. Inventions are established for the respective features. In the following description, a first embodiment mainly relates to the first aspect of the present invention, and second and third embodiments mainly relate to the second aspect of the present invention. The descriptions in the first to third embodiments can be combined with each other.

1. First Embodiment

Figure 1A:
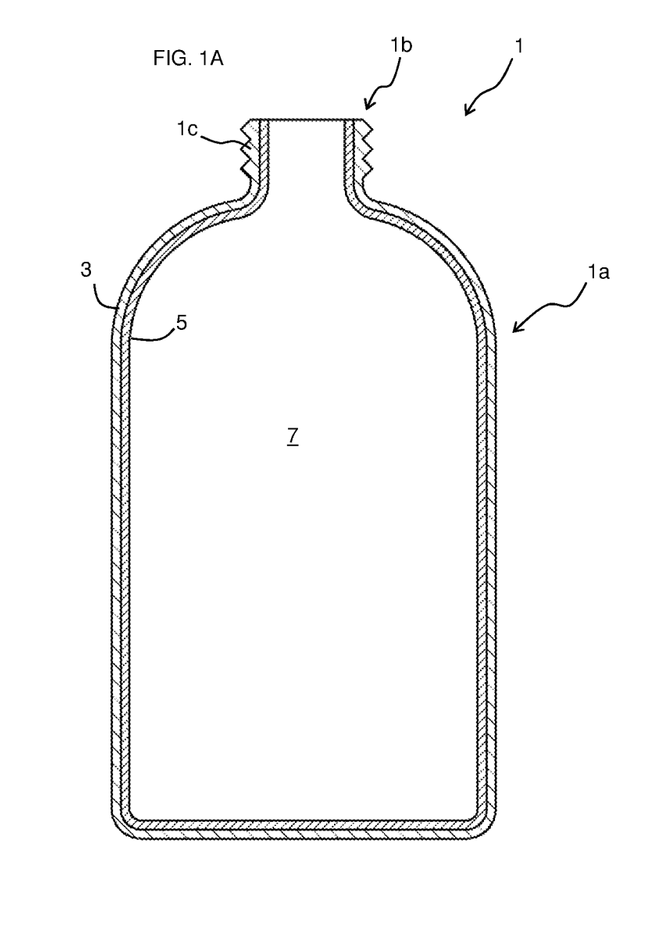
Figure 1B:
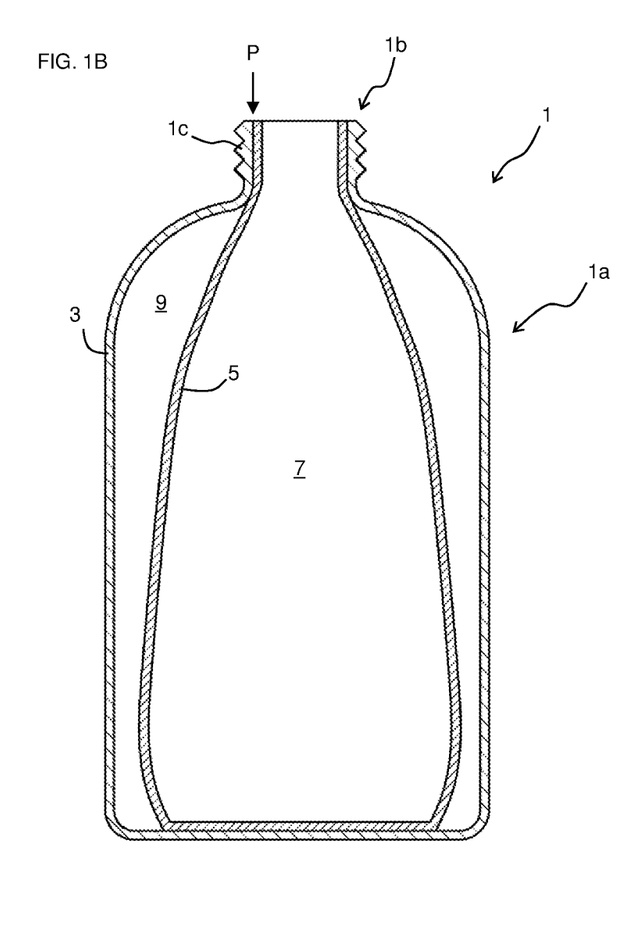

As shown in FIGS. 1A and 1B, a delamination container 1 of a first embodiment of the present invention includes a body 1a including a cylindrical barrel and a bottom, and an opening 1b through which contents are charged and discharged. The opening 1b is provided with a male screw 1c. A cap, pump, or the like having a female screw is mounted on the male screw 1c. Note that a cap need not be mounted using a screw, and a spigot cap may be used.

The delamination container 1 includes an outer layer 3 as the outer surface of the container and an inner layer 5 as the inner surface thereof. Contents are charged into containing space 7 surrounded by the inner layer 5. FIG. 1A shows the state in which contents are filled with the container and thus the outer layer 3 and inner layer 5 are in contact with each other. FIG. 1B shows the state in which due to the discharge of the contents through the opening 1b, the inner layer 5 is peeled from the outer layer 3 and the containing space 7 is shrunk. An air inlet may be formed in the outer layer 3 of the body 1a or opening 1b so that air can be introduced into space 9 between the outer layer 3 and inner layer 5 through the air inlet. Further, a check valve may be disposed on the air inlet so that the discharge of air from the space 9 to outside is prevented.

The contents in the containing space 7 may be discharged through the opening 1b by pressing the outer layer 3 and thus pressing the inner layer 5 together as is done in a squeezable container containing contents such as mayonnaise or soy sauce. Or, if a pump is mounted on the male screw 1c, the contents may be discharged by operating the pump. If a check valve is disposed on the air inlet, when the outer layer 3 is pressed, the internal pressure of the air between the outer layer 3 and inner layer 5 is increased, and the inner layer 5 is pressed. Thus, the contents can be discharged.

Figure 2:
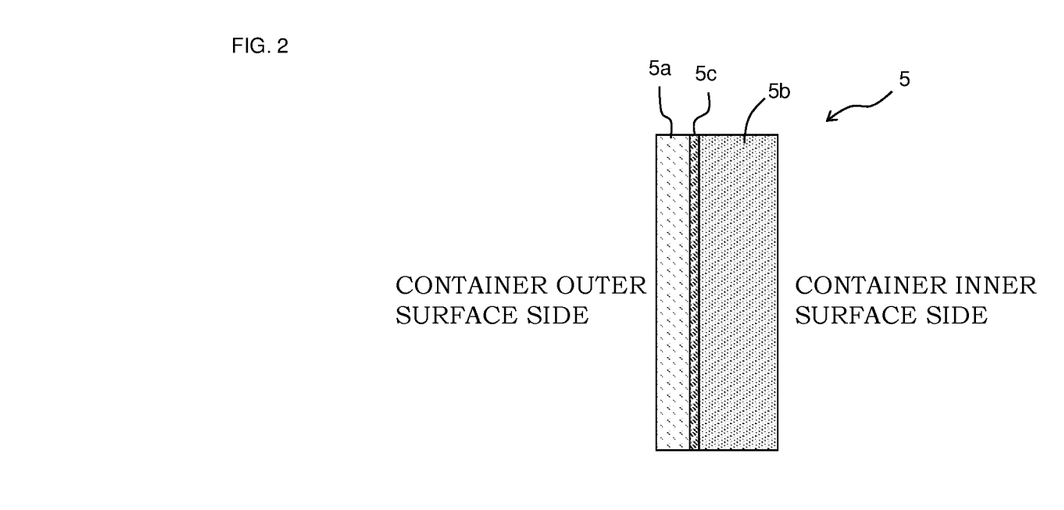
FIG. 2 is a sectional view showing the configuration of the inner layer 5 of the delamination container 1 of the first embodiment of the present invention.

When air enters the space 9 between the outer layer 3 and inner layer 5, the outermost layer of the inner layer 5 is exposed to the air. FIG. 2 shows the detailed configuration of the inner layer 5. As shown in FIG. 2, the inner layer 5 includes an EVOH layer 5a as the outermost layer, an inner surface layer 5b disposed on the side adjacent to the inner surface of the container, of the EVOH layer 5a, and an bonding layer 5c between the EVOH layer 5a and inner surface layer 5b. The disposition of the EVOH layer 5a increases gas barrier properties. While, in the present embodiment, the outermost layer of the inner layer 5 is the EVOH layer 5a, the outermost layer may be a layer formed of any other resin having a standard peel strength of 7 to 12 g/15 mm.

The EVOH layer 5a is formed of an ethylene-vinyl alcohol copolymer (EVOH) resin and is obtained by the hydrolysis of ethylene and a vinyl acetate copolymer. The ethylene content of the EVOH resin is, for example, 25 to 50 mol %, but is preferably 25 to 35 mol %, more preferably 25 to 30 mol % in terms of oxygen barrier properties. The lower limit of the ethylene content is not limited to a particular content, but is preferably 25 mol % or more, since the flexibility of the EVOH layer 5a decreases as the ethylene content decreases. Preferably, the EVOH layer 5a contains an oxygen absorbent. The EVOH layer 5a containing an oxygen absorbent can exhibit higher oxygen barrier properties.

The standard peel strength of the EVOH layer 5a is 7 to 12 g/15 mm. It was experimentally confirmed that when the standard peel strength was in the above range, an ideal delamination container 1 could be obtained that easily peeled the inner layer 5 from the outer layer 3 in the body 1a and was less likely to peel the inner layer 5 from the outer layer 3 at the opening 1b. Specifically, the standard peel strength is, for example, 7 g/15 mm, 7.5 g/15 mm, 8 g/15 mm, 8.5 g/15 mm, 9 g/15 mm, 9.5 g/15 mm, 10 g/15 mm, 10.5 g/15 mm, 11 g/15 mm, 11.5 g/15 mm, or 12 g/15 mm, or may be between any two of the values presented. A method for measuring the standard peel strength will be described in detail in Examples.

The tensile modulus of the EVOH layer 5a is preferably 2000 MPa or less, more preferably 1800 MPa. The reason is that the EVOH layer 5a having too high a tensile modulus is less likely to smoothly peel from the outer layer 3. The lower limit of the tensile modulus may be any value and is, for example, 1000 MPa. Specifically, the tensile modulus is, for example, 1000, 1100, 1200, 1300, 1400, 1500, 1600, 1700, 1800, 1900, or 2000 MPa, or may be between any two of the values presented.

The inner surface layer 5b contacts the contents of the delamination container 1. The inner surface layer 5b is formed of, for example, a polyolefin, such as low-density polyethylene, linear low-density polyethylene, high-density polyethylene, polypropylene, ethylene-propylene copolymer, or a mixture thereof. Preferably, the inner surface layer 5b is formed of low-density polyethylene or linear low-density polyethylene.

The bonding layer 5c has the function of bonding the EVOH layer 5a and inner surface layer 5b together. For example, the bonding layer 5c is obtained by adding, to one of the above polyolefins, an acid-modified polyolefin obtained by introducing carboxyl (e.g., maleic anhydride-modified polyethylene), or is formed of an ethylene-vinyl acetate copolymer (EVA). One example of the bonding layer 5c is a mixture of low-density polyethylene or linear low-density polyethylene and acid-modified polyethylene.

The outer layer 3 is formed of, for example, one of the above polyolefins, preferably polypropylene. While, in the present embodiment, the outer layer 3 consists of a monolayer, it may be multilayered. If the outer layer 3 is multilayered, the innermost layer thereof is preferably a polypropylene layer. For example, the outer layer 3 may have a configuration in which both sides of a repro layer are sandwiched between polypropylene layers. As used herein, the term "repro layer" refers to a layer formed by recycling burrs generated when a container is molded. To obtain restorability, the outer layer 3 is formed so as to be thicker than the inner layer 3.

The delamination container 1 of the present embodiment may be produced using any method. For example, the delamination container 1 may be produced by extruding a melted multilayer parison having a multilayer structure corresponding to a container to be produced, setting the melted multilayer parison in a blow molding die, and molding it into the desired container shape by blow molding. While a pinch-off is not shown in FIG. 1, it is disposed on the bottom or the like of the container as appropriate. An air inlet may be formed using a punch, drill, or the like after extracting the blow-molded product from the die.

While contents may be charged into the blow-molded delamination container 1, preliminary peel may be conducted on the delamination container 1 before charging contents thereinto. In the delamination container 1 of the present embodiment, preliminary peel can be conducted, for example, by introducing air between the outer layer 3 and inner layer 5 through the air inlet formed in the outer layer 3. Or, preliminary peel may be conducted by forcefully injecting air between the outer layer 3 and inner layer 5 through the interface P therebetween. The method for injecting air through the interface P of the opening of the container is as follows: when molding a container, a tubular portion is formed integrally with the container so as to further extend from the end of the container opening; the inner layer of the tubular portion is partially peeled by pressing part of the tubular portion toward the center of the tubular portion; a hole is formed in the outer layer corresponding to the peeled portion; and air is injected into the hole. To prevent the leak-out of the air injected through the interface of the open end of the tubular portion, the interface of the open end may be sealed by pushing a plug or the like into the open end and closely contacting the inner layer and outer layer of the open end to each other. After the preliminary peel step, the tubular portion, which is not required by the container, is cut off. Thus, the container shown in FIG. 1 is obtained.

2. Second Embodiment

Figure 5:
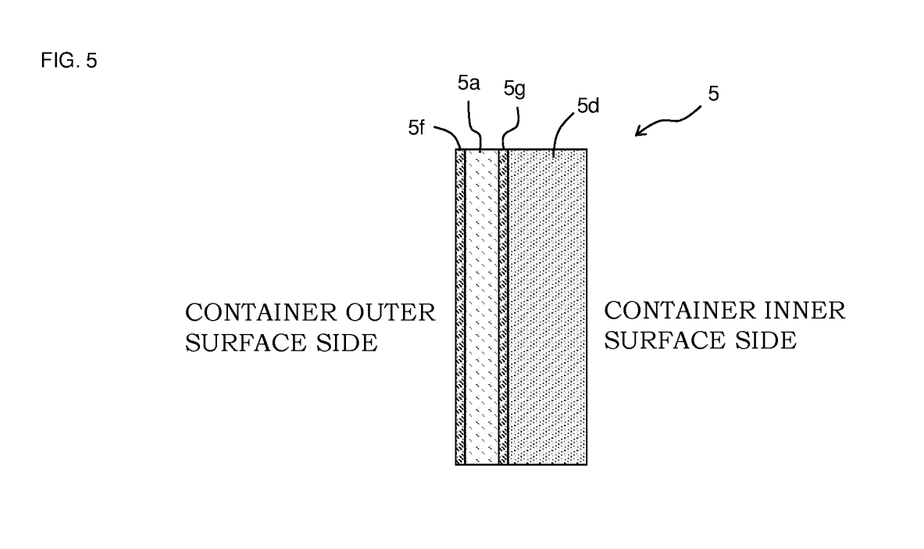
FIG. 5 is a sectional view showing the configuration of an inner layer 5 of a delamination container 1 of a second embodiment of the present invention.

Referring to FIG. 5, a second embodiment of the present invention will be described. The present embodiment is similar to the first embodiment, and a major difference therebetween is the configuration of an inner layer 5. The following description will focus on the difference.

As shown in FIG. 5, the inner layer 5 includes an EVOH layer 5a, an outer barrier layer 5f disposed on the side adjacent to the outer surface of the container, of the EVOH layer 5a, an inner barrier layer 5g disposed on the side adjacent to the inner surface of the container, of the EVOH layer 5a, and an inner surface layer 5d disposed on the side adjacent to the inner surface of the container, of the inner barrier layer 5g. The outer barrier layer 5f and inner barrier layer 5g have the function of covering the EVOH layer 5a to reduce the contact between the EVOH layer 5a and air. In the present embodiment, the barrier layers are disposed on both sides of the EVOH layer 5a and thus the EVOH layer 5a is prevented from contacting air. In a conventional delamination container 1, on the other hand, an outer barrier layer 5f is not disposed on the side adjacent to the outer surface of the container, of the EVOH layer 5a and thus air entering space 9 between an outer layer 3 and inner layer 5 directly contacts the EVOH layer 5a. For this reason, when the delamination container 1 is used in a high-humidity environment, the EVOH layer 5a is denatured by water vapor contained in the air and thus the oxygen barrier properties decrease. According to the present embodiment, such denaturation of the EVOH layer 5a by water vapor can be suppressed.

Preferably, the EVOH layer 5a contains an oxygen absorbent. The EVOH layer 5a containing an oxygen absorbent can exhibit higher oxygen barrier properties. On the other hand, an experiment conducted by the present inventors revealed that when the EVOH layer 5a containing an oxygen absorbent absorbed oxygen and reacted therewith, an odorant occurred. However, when barrier layers are disposed on both sides of the EVOH layer 5a as in the present embodiment, the discharge of such an odorant to outside is suppressed.

The outer barrier layer 5f and inner barrier layer 5g may be formed of any material as long as the material inhibits the contact between the EVOH layer 5a and air. For example, these layers are formed of a polyolefin. If the adhesion between the barrier layers formed of only polyolefin and the EVOH layer 5a is not sufficient, an acid-modified polyolefin obtained by introducing carboxyl (e.g., maleic-anhydride-modified polyethylene) may be added to the polyolefin. Examples of the polyolefin include low-density polyethylene, linear low-density polyethylene, high-density polyethylene, polypropylene, ethylene-propylene copolymer, and mixtures thereof. More specifically, the outer barrier layer 5f is formed of, for example, a mixture of low-density polyethylene and acid-modified polyethylene. The inner barrier layer 5g is formed of, for example, an ethylene-vinyl acetate copolymer (EVA), low-density polyethylene, linear low-density polyethylene, or a mixture of low-density polyethylene or linear low-density polyethylene and acid-modified polyethylene. The outer barrier layer 5f is preferably formed of an ethylene-vinyl acetate copolymer (EVA) in terms of the adhesion with the EVOH layer 5a and the peelability from the outer layer 3.

The inner surface layer 5d is disposed on the side adjacent to the inner surface of the container, of the inner barrier layer 5g. The inner surface layer 5d is formed of, for example, one of the polyolefins described above, preferably linear low-density polyethylene. The inner barrier layer 5g also serves as a layer bonding the EVOH layer 5a and inner surface layer 5d together.

3. Third Embodiment

Figure 6:
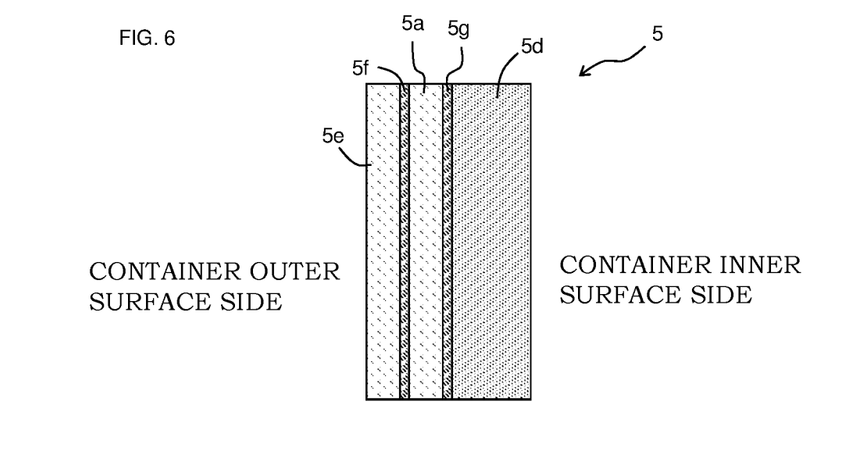
FIG. 6 is a sectional view showing the configuration of an inner layer 5 of a delamination container 1 of a third embodiment of the present invention.

Referring to FIG. 6, a third embodiment of the present invention will be described. The present embodiment is similar to the first embodiment, and a major difference therebetween is the configuration of an inner layer 5. The following description will focus on the difference.

In the present embodiment, as shown in FIG. 6, the inner layer 5 includes the elements in the second embodiment, as well as an outer EVOH layer 5e disposed on the side adjacent to the outer surface of the container, of an outer barrier layer 5f.

In the second embodiment, the outer barrier layer 5f is the outermost layer of the inner layer 5. For this reason, when an acid-modified polyolefin is added to the outer barrier layer 5f in order to increase the adhesion between the outer barrier layer 5f and EVOH layer 5a, there occur a problem that the adhesion between the outer barrier layer 5f and outer layer 3 is also increased and thus the inner layer 5 is less likely to peel from the outer layer 3.

For this reason, in the present embodiment, the outer EVOH layer 5e is disposed on the side adjacent to the outer surface of the container, of the outer barrier layer 5f. Thus, the outer barrier layer 5f is prevented from contacting the outer layer 3 and thus the peelability of the inner layer 5 from the outer layer 3 is increased. Further, as with the EVOH layer 5a, the outer EVOH layer 5e is formed of an ethylene-vinyl alcohol copolymer (EVOH) resin and therefore has excellent oxygen barrier properties. Thus, the disposition of the outer EVOH layer 5e further suppresses the degradation of the EVOH layer 5a. The ethylene contents of the outer EVOH layer 5e and EVOH layer 5a may be the same or different. For example, by making the ethylene content of the EVOH layer 5a lower than that of the outer EVOH layer 5e, it is possible to increase the oxygen barrier properties of the EVOH layer 5a, as well as to increase the peelability from the outer layer 3.

EXAMPLES

Figure 3:
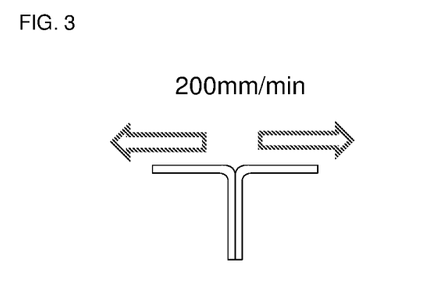
FIG. 3 shows a peel strength measuring method in Examples of the present invention.
Figure 4:
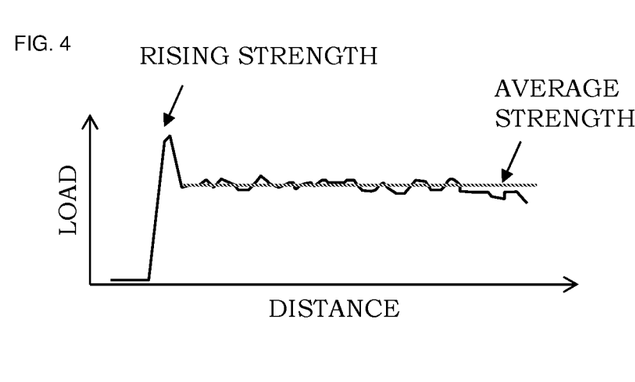
FIG. 4 is an example of a graph showing the relationship between the distance and load during a peel strength test in Examples of the present invention.

Examples described below relates to the first embodiment (first aspect) of the present invention.
1. Production of Delamination Container 1
A delamination container including a body and an opening was produced by blow molding on the following conditions.
(1) Shape of Container
Body: φ 47 mm, height 110 mm
Opening: φ 30 mm, height 16 mm
(2) Layer Configuration
Outer layer: polypropylene (model "FSX16E9" available from Sumitomo Chemical Company, Limited)
Inner layer: three-layer configuration consisting of an outermost layer, a bonding layer, and an inner surface layer which are more adjacent to the outer layer in this order)
Outermost layer: resins shown in Table 1
Bonding layer: the ratio between the bonding component (model "MODIC L522" available from Mitsubishi Chemical Corporation) and LLDPE (model "HARMOREX F325N" available from Japan Polyethylene Corporation) is 1:1
Inner surface layer: LLDPE (model "HARMOREX F325N" available from Japan Polyethylene Corporation)
(3) Blow Molding Conditions
Melted resins were co-extruded to obtain the above layer configuration so as to produce a melted multilayer parison; and the melted multilayer parison was set in a blow molding die and molded into the desired container shape by blow molding. The co-extrusion conditions were adjusted so that the thicknesses of the outer layer and inner layer fell within a range of 70 to 130 μm and the thickness ratio of the outer layer to inner layer was 0.8 to 1.3. The blow molding conditions were as follows: blow pressure 0.4 MPa, die temperature 25° C., and blow time 15 seconds.
2. Peel Strength Measurement
The T-type peel strength of the delamination container produced on the above conditions was measured using an adhesion and peeling resistance tester (type "HEIDON-17" available from Shinto Scientific Co., Ltd.). Specifically, a strip of 15 mm (circumference)×100 mm (height) was cut from the produced container, and the outer layer and inner layer of the strip were peeled from each other by 40 to 50 mm at a test speed of 200 mm/min so that the strip takes a T-shape, as shown in FIG. 3. FIG. 4 is a graph showing an example of the relationship between the distance and load during the peel. The average strength ignoring the initial rising strength was defined as "the standard peel strength." The results are shown in Table 1.
3. Evaluation
(1) Peelability of Body
Preliminary peel was performed by forming an air inlet in the outer layer of the body of the delamination container produced on the above conditions and injecting air between the outer layer and inner layer through the air inlet. The air was injected at a pressure of 0.3 MPa for 1.0 second. The peel state of the body subjected to the preliminary peel was visually observed and evaluated by the following criteria.
<Peelability of Body>
○: the unpeeled area is less than 20% of the body.
x: the unpeeled area is equal to or more than 20% of the body.
(2) Peel Resistance of Opening
After performing the preliminary peel, the container was pressed with a force of about 30 kg with the air inlet closed so as to pressurize the air between the outer layer and inner layer. At this time, it was checked whether the air was leaking from the interface between the outer layer and inner layer at the opening. For Comparative Example 4, preliminary peel could not be performed thereon. Accordingly, the peel resistance of the opening was not checked.
<Peel Resistance of Opening>
○: air did not leak from opening interface.
x: air leaked from opening interface.

TABLE 1

| | | Example | | | Comparative Example | | | |
|---|---|---|---|---|---|---|---|---|
| | | 1 | 2 | 3 | 1 | 2 | 3 | 4 |
| Outermost layer resin of inner layer | | SF7503B | AP461 | EV3010 | DC3212B | D2908 | ST230 | LDPE F108-1 |
| Addition of oxygen absorbent | | X | ○ | ○ | X | X | X | — |
| Ethylene content (mol %) | | 29 | 32 | 27 | 32 | 29 | 44 | — |
| Standard peel strength (g/15 mm) | | 9.92 | 9.88 | 8.34 | 5.48 | 4.52 | 3.00 | 73 |
| Evaluation | Peelability of body | ○ | ○ | ○ | ○ | ○ | ○ | X |
| | Peel resistance of opening | ○ | ○ | ○ | X | X | X | — |

Details of the resins shown in Table 1 are as follows.
SF7503B: EVOH resin available from Nippon Synthetic Chemical Industry Co., Ltd
AP461: EVOH resin available from KURARAY CO., LTD
EV3010N: EVOH resin available from Zeon Corporation
DC3212B: EVOH resin available from Nippon Synthetic Chemical Industry Co., Ltd
D2908: EVOH resin available from Nippon Synthetic Chemical Industry Co., Ltd
ST230: EVOH resin available from Nippon Synthetic Chemical Industry Co., Ltd
F108-1: LDPE resin available from Sumitomo Chemical Company, Limited 4. Examination
As shown in Table 1, Examples 1 to 3 having standard peel strengths of 7 to 12 g/15 mm were excellent in both the peelability of the body and the peel resistance of the opening. On the other hand, Comparative Examples 1 to 3 having standard peel strengths of less than 7 g/15 mm were not sufficient in the peel resistance of the opening. Also, Comparative Example 4 having a standard peel strength of more than 12 g/15 mm was poor in the peelability of the body.

DESCRIPTION OF REFERENCE SIGNS

1: delamination container, 3: outer layer, 5: inner layer 5, 7: containing space, 9: space

The invention claimed is:

1. A delamination container having laminated outer and inner layers, comprising:
   a body configured to contain contents; and
   an opening through which the contents from the body are discharged, wherein
   the outer layer comprises a body outer layer at the body and an opening outer layer at the opening,
   the inner layer comprises a body inner layer at the body and an opening inner layer at the opening,
   the inner layer peels from the outer layer and shrinks with a reduction in the contents,
   the inner layer comprises a plurality of layers including an inner surface layer, a bonding layer, and an outermost layer, wherein the outermost layer is an ethylene-vinyl alcohol copolymer layer having a standard peel strength of 7 to 12 g/15 mm, and
   the standard peel strength is a peel strength measured when the inner layer is peeled from the outer layer for a first time.

2. The delamination container of claim 1, wherein the ethylene-vinyl alcohol copolymer layer has the property of oxygen absorption.

3. The delamination container of claim 1, wherein the ethylene-vinyl alcohol copolymer layer has an ethylene content of 30 mol % or less.

4. The delamination container of claim 1, wherein the outer layer comprises a plurality of layers including a polypropylene layer as an innermost layer.

* * * * *